(12) United States Patent
Murakami et al.

(10) Patent No.: US 9,115,250 B2
(45) Date of Patent: *Aug. 25, 2015

(54) PROCESS FOR PRODUCING POLYAMIC ACID SOLUTION AND POLYAMIC ACID SOLUTION

(75) Inventors: Tooru Murakami, Ube (JP); Seiichirou Takabayashi, Ube (JP)

(73) Assignee: UBE Industries, Ltd., Ube-shi (JP)

( * ) Notice: Subject to any disclaimer, the term of this patent is extended or adjusted under 35 U.S.C. 154(b) by 225 days.

This patent is subject to a terminal disclaimer.

(21) Appl. No.: 12/514,793

(22) PCT Filed: Nov. 12, 2007

(86) PCT No.: PCT/JP2007/071938
§ 371 (c)(1),
(2), (4) Date: May 29, 2009

(87) PCT Pub. No.: WO2008/059801
PCT Pub. Date: May 22, 2008

(65) Prior Publication Data
US 2010/0056718 A1 Mar. 4, 2010

(30) Foreign Application Priority Data
Nov. 13, 2006 (JP) .................. 2006-306498

(51) Int. Cl.
*C08G 73/10* (2006.01)

(52) U.S. Cl.
CPC .................. *C08G 73/1028* (2013.01)

(58) Field of Classification Search
CPC  C08L 79/08; C08G 73/1007; C08G 73/1028; C08G 73/1032; C08G 73/1042; C08G 73/1046; C08G 73/105
USPC .......... 524/879, 104; 528/310, 288, 292, 296, 528/302, 318, 324, 332, 350, 353
See application file for complete search history.

(56) References Cited

U.S. PATENT DOCUMENTS

| 4,290,936 A | | 9/1981 | Sasaki et al. | |
| 4,454,276 A | * | 6/1984 | Uda et al. | 524/209 |
| 4,487,911 A | | 12/1984 | Lange et al. | |
| 4,535,105 A | | 8/1985 | Inaike et al. | |
| 4,568,715 A | * | 2/1986 | Itatani et al. | 524/348 |
| 5,262,227 A | * | 11/1993 | Takabayashi et al. | 428/215 |
| 5,693,745 A | * | 12/1997 | Kuo et al. | 528/350 |

FOREIGN PATENT DOCUMENTS

| JP | 56-038324 A | 4/1981 |
| JP | 57-131248 A | 8/1982 |
| JP | 59-164328 A | 9/1984 |
| JP | 59-204619 A | 11/1984 |
| JP | 61-258836 A | 11/1986 |
| JP | A-H07-300524 | 11/1995 |
| JP | 11-080352 A | 3/1999 |

OTHER PUBLICATIONS

Office Action issued in corresponding Chinese Application No. 200780046302.0, dated Feb. 23, 2011.
Extended European Search Report issued in European Patent Application No. 07831668.4 on Jul. 4, 2012.
Office Action issued on Apr. 17, 2013 for Japanese Patent Application No. 2007-294691.

* cited by examiner

*Primary Examiner* — Jane L Stanley
(74) *Attorney, Agent, or Firm* — Knobbe, Martens, Olson & Bear LLP

(57) ABSTRACT

In a first step, a diamine is reacted with a molar excess of a tetracarboxylic dianhydride in a solvent containing more than ⅓ mole of water per mole of the tetracarboxylic dianhydride, whereby preparing a polyamic acid solution. Subsequently, in a second step, a diamine and/or a tetracarboxylic dianhydride are added to the polyamic acid solution obtained in the first step so that the molar amount of the diamine component is substantially equal to the molar amount of the tetracarboxylic acid component, and then the diamine and the tetracarboxylic dianhydride are reacted, whereby preparing a polyamic acid solution. By this process, a polyamic acid solution having a high concentration and a low viscosity may be reproducibly and reliably produced, while controlling the molecular weight of the polyamic acid to a predetermined low level.

5 Claims, No Drawings

US 9,115,250 B2

PROCESS FOR PRODUCING POLYAMIC ACID SOLUTION AND POLYAMIC ACID SOLUTION

This application is U.S. National Phase of International Application PCT/JP2007/071938, filed Nov. 12, 2007 designating the U.S., and published in Japanese as WO 2008/059801 on May 22, 2008, which claims priority to Japanese Patent Application No. 2006-306498 filed Nov. 13, 2006.

TECHNICAL FIELD

The present invention relates to a novel process for producing a polyamic acid solution which is a polyimide precursor solution. A polyamic acid solution having a high concentration and a low viscosity, in particular, may be reliably produced by the production process.

BACKGROUND ART

A polyamic acid solution is used in various applications as a polyimide precursor solution. In general, a polyamic acid solution may be suitably prepared by reacting substantially equimolar amounts of a diamine and a tetracarboxylic dianhydride in a solvent at a low temperature for suppressing an excessive imidization reaction. However, it is difficult to produce a polyamic acid solution having a high concentration by this process because a polyamic acid is readily polymerized, leading to higher viscosity of the solution.

Patent Document 1 discloses a process for producing a polyamic acid solution composition in which substantially equimolar amounts of a biphenyltetracarboxylic dianhydride and an aromatic diamine are reacted at a reaction temperature of 100° C. or lower in an organic polar solvent containing about 0.5 mole to about 40 mole of water per mole of the biphenyltetracarboxylic dianhydride to give a homogeneous reaction solution, and then free water is removed from the reaction solution to lower the content of free water in the reaction solution as measured by nuclear magnetic resonance spectrometry to 0.5 wt % or less. However, because the reaction of an acid anhydride group and an amino group and the reaction of an acid anhydride group and water proceed competitively in this process, it is difficult to control the reaction, and therefore it is not easy to control a molecular weight of a polyamic acid obtained reproducibly and reliably. Furthermore, in Examples of Patent Document 1, with regard to low molecular weight of the polyamic acid, the polyamic acid solution having a polyamic acid logarithmic viscosity of 0.43 was obtained (Example 13). With regard to high concentration of the polyamic acid solution, the polyamic acid solution having a polymer concentration of 26.0 wt % was obtained (Example 9). Nevertheless, it is still difficult to produce a polyamic acid solution having a higher concentration and a lower molecular weight of the polyamic acid. In addition, water must be removed from the reaction solution after the completion of the reaction in this process, which requires a complicated step.

LIST OF REFERENCE(S)

Patent Document 1: Japanese Laid-open Patent Publication No. 1982-131248.

DISCLOSURE OF THE INVENTION

Problems to be Solved by the Invention

An objective of the present invention is to provide a novel process for producing a polyamic acid solution having a high concentration and a low viscosity reproducibly and reliably, by controlling the molecular weight of the polyamic acid to a predetermined low level. Another objective of the present invention is to provide a novel polyamic acid solution having a logarithmic viscosity of 0.4 or lower in which the molecular weight of the polyamic acid is suitably controlled to a desired low level.

Means for Solving the Problems

The present invention relates to the followings.

[1] A process for producing a polyamic acid solution by reacting a diamine with a tetracarboxylic dianhydride in a solvent, comprising:

a first step in which a diamine is reacted with a molar excess of a tetracarboxylic dianhydride in a solvent containing more than 1/3 mole of water per mole of the tetracarboxylic dianhydride, whereby preparing a polyamic acid solution; and a second step in which a diamine, or a diamine and a tetracarboxylic dianhydride are added to the polyamic acid solution obtained in the first step so that the molar amount of the diamine component is substantially equal to the molar amount of the tetracarboxylic acid component, and then the diamine and the tetracarboxylic dianhydride are reacted.

[2] The process for producing a polyamic acid solution as described in [1], wherein in the first step, the molar ratio of the tetracarboxylic dianhydride to the diamine (tetracarboxylic dianhydride/diamine) is 1.2 or more.

[3] The process for producing a polyamic acid solution as described in any one of [1] to [2], wherein in the first step, the content of water in the solvent used is within a range of 0.05 wt % to 2 wt %.

[4] The process for producing a polyamic acid solution as described in any one of [1] to [3], wherein the polyamic acid solution obtained in the second step has a polyamic acid logarithmic viscosity of 0.4 or lower.

[5] The process for producing a polyamic acid solution as described in any one of [1] to [4], wherein the polyamic acid solution obtained has a water content in the solution of 1 wt % or less.

[6] The process for producing a polyamic acid solution as described in any one of [1] to [5], wherein the polyamic acid solution obtained has a solid content concentration of 25 wt % to 50 wt % and a solution viscosity at 30° C. of 50 Pa·sec or lower.

[7] The process for producing a polyamic acid solution as described in any one of [1] to [6], wherein the amount of the tetracarboxylic dianhydride to be reacted in the first step is within a range of 10 mol % to 70 mol % based on the total amount of the tetracarboxylic dianhydride to be reacted in the first step and the second step.

[8] A polyamic acid solution prepared from substantially equimolar amounts of a diamine component and a tetracarboxylic acid component, and having a polyamic acid logarithmic viscosity of 0.4 or lower, in which an acid anhydride group derived from the tetracarboxylic dianhydride which is not involved in the amic acid bond is hydrolyzed to be two carboxyl groups.

[9] The polyamic acid solution as described in [8], having a water content in the solution of 1 wt % or less.

[10] The polyamic acid solution as described in any one of [8] to [9], having a solid content concentration of 25 wt % to 50 wt % and a solution viscosity at 30° C. of 50 Pa·sec or lower.

Effect of the Invention

A polyamic acid solution having a high concentration and a low viscosity in which the molecular weight of the polyamic acid is controlled to a predetermined low level may be reproducibly and reliably produced by the novel production process of the present invention. Furthermore, according to the present invention, there can be provided a novel polyamic acid solution having a polyamic acid logarithmic viscosity of 0.4 or lower.

BEST MODE FOR CARRYING OUT THE INVENTION

The process for producing a polyamic acid solution of the present invention is a process for producing a polyamic acid solution by reacting a diamine with a tetracarboxylic dianhydride in a solvent, in which a diamine is reacted with a molar excess of a tetracarboxylic dianhydride in a solvent containing more than 1/3 mole of water per mole of the tetracarboxylic dianhydride to prepare a polyamic acid solution as a first step, and then a diamine, or a diamine and a tetracarboxylic dianhydride are added to the polyamic acid solution thus obtained so that the molar amount of the diamine component is substantially equal to the molar amount of the tetracarboxylic acid component, and subsequently, the diamine and the tetracarboxylic dianhydride are reacted as a second step.

The "poly"amic acid of the present invention has a very low molecular weight and is not necessarily a polymer. The term "polyamic acid" as used herein means a polyimide precursor including a component having an amic acid structure which consists of starting components such as an amic acid oligomer, a low-molecular-weight amic acid compound such as a compound formed by reacting one molecule of a diamine with one or two molecules of a tetracarboxylic dianhydride, for example, a tetracarboxylic acid formed by the hydrolysis of the tetracarboxylic dianhydride, and the like.

In the present invention, any of diamines used for a polyimide may be used without limitation. An aromatic diamine to give an aromatic polyimide may be preferably used. Preferable examples of the diamine may include diamines having one benzene ring such as m- or p-phenylenediamine, 2,4-diaminophenol, 3,5-diaminobenzoate, and 2,4-diaminotoluene; diamines having two benzene rings as a biphenyl structure such as o-orthotolidine sulfone, 2,2'-dimethyl-4,4'-diaminobiphenyl, and 2,2'-bis(trifluoromethyl)-4,4'-diaminobiphenyl; diamines having two benzene rings linked by a group such as —O—, —S—, —CO—, —SO$_2$—, —SO— and —CH$_2$—, for example, such as 4,4'-diaminodiphenyl ether, 4,4'-diaminodiphenyl thioether, 4,4'-diaminodiphenylmethane, 4,4'-diaminodiphenyl sulfone, 4,4'-diaminobenzophenone, and 5(6)-amino-1-(4-amino methyl)-1,3,3-trimethyl indane; and diamines having at least three benzene rings such as 1,3-bis(3-aminophenoxy)benzene, 1,4-bis(4-aminophenoxy)benzene, 2,2-bis(4-aminophenoxy phenyl)propane, 2,2-bis[4-(4-aminophenoxy)phenyl] hexafluoropropane, and 9,9-bis(4-aminophenyl)florene. Cycloaliphatic diamines such as isophorone diamine, and 1,4-diaminocyclohexane may be also preferably used.

In the present invention, any of tetracarboxylic dianhydrides used for a polyimide may be used without limitation. An aromatic tetracarboxylic dianhydride to give an aromatic polyimide may be preferably used. Preferable examples of the tetracarboxylic dianhydride may include 3,3',4,4'-biphenyltetracarboxylic dianhydride, 2,3,3',4'-biphenyltetracarboxylic dianhydride, 2,2',3,3'-biphenyltetracarboxylic dianhydride, pyromellitic dianhydride, 3,3',4,4'-benzophenone tetracarboxylic dianhydride, oxydiphthalic dianhydride, 3,3', 4,4'-diphenylsulfone tetracarboxylic dianhydride, 2,3,6,7-naphthalene tetracarboxylic dianhydride, 1,4,5,8-naphthalene tetracarboxylic dianhydride, and 4,4'-(2,2-hexafluoroisopropylidene)diphthalic dianhydride.

A preferable solvent may be an organic polar solvent having a boiling point at atmospheric pressure of 300° C. or lower, in which the polyamic acid is soluble. Examples of the solvent may include solvents having a nitrogen atom in the molecule such as N,N-dimethylacetamide, N,N-diethylacetamide, N,N-dimethylformamide, N,N-diethylformamide, N-methyl-2-pyrrolidone, 1,3-dimethyl-2-imidazolidinone, and N-methylcaprolactam; solvents having a sulfur atom in the molecule such as dimethyl sulfoxide, diethyl sulfoxide, dimethyl sulfone, diethyl sulfone, and hexamethyl sulfolamide; solvents which are phenols such as cresol, phenol, and xylenol; solvents having an oxygen atom in the molecule such as diethylene glycol dimethyl ether (diglyme), triethylene glycol dimethyl ether (triglyme), and tetraglyme; and other solvents such as acetone, dimethylimidazoline, methanol, ethanol, ethylene glycol, dioxane, tetrahydrofuran, pyridine, and tetramethylurea.

In the first step in the process for producing a polyamic acid solution of the present invention, a diamine is reacted with a molar excess of a tetracarboxylic dianhydride in a solvent containing more than 1/3 mole of water per mole of the tetracarboxylic dianhydride to prepare a polyamic acid solution. A polyamic acid formed in this step mostly has a molecular weight depending on the molar ratio of the tetracarboxylic dianhydride to the diamine, which is a low molecular weight. The polyamic acid generally has tetracarboxylic dianhydride components at both its molecular terminal, and an acid anhydride group which is derived from the tetracarboxylic dianhydride component at its molecular terminal and is not involved in the amic acid bond is hydrolyzed by the action of water present in the solvent to be two carboxyl groups. When the amount of water is insufficient, it may be difficult to prepare a polyamic acid having a low molecular weight, because many acid anhydride groups remain unhydrolyzed and react with a diamine added in the second step to form a polyamic acid having a high molecular weight. Furthermore, when the amount of water is insufficient, a polyamic acid may be polymerized and the viscosity of the solution may become higher. In such cases, some of tetracarboxylic dianhydride component added in the second step may not be dissolved in the solution, and therefore a homogeneous polyamic acid solution may not be prepared.

In the first step, it is preferable to use a solvent containing water in an amount of 0.05 wt % to 2 wt %, more preferably 0.05 wt % to 1 wt %. When using a solvent containing more than 2 wt % of water, it may be difficult to prepare a polyamic acid having a predetermined low molecular weight reproducibly, because the reaction of an acid anhydride group and an amino group proceeds more competitively to the reaction of an acid anhydride group and water. Furthermore, when the polyamic acid solution obtained contains a large amount of water, the solution stability may be deteriorated. In addition, it is undesirable to remove an excessive amount of water from the solution after the completion of the reaction. The removal of water must be conducted at a low temperature and under a reduced pressure for suppressing an excessive imidization reaction, leading to a more complicated process.

In the first step, a diamine is reacted with an excessive molar amount of a tetracarboxylic dianhydride. The molar ratio of the tetracarboxylic dianhydride to the diamine (the molar amount of the tetracarboxylic dianhydride/the molar amount of the diamine) is preferably 1.2 or more, more preferably 1.5 or more, particularly preferably from about 1.5 to about 5.0. When the molar ratio is 2 or more, the tetracarboxylic dianhydride which is unreacted with the diamine is mostly hydrolyzed by the action of water present in the solvent to be a tetracarboxylic acid, which coexists in the polyamic acid solution after the completion of the reaction. It does not cause any problems, as long as the tetracarboxylic acid is homogeneously dissolved in the solution.

In general, the amount of the tetracarboxylic dianhydride to be reacted in the first step is preferably from 10 mol % to 70 mol %, more preferably from 20 mol % to 50 mol %, based on the total amount of the tetracarboxylic dianhydride to be reacted in the first step and the second step, although the whole amount of the tetracarboxylic dianhydride used for the preparation of a polyamic acid solution may be added to the solvent and reacted in the first step, with no tetracarboxylic dianhydride added to the solution in the second step. When the amount of the tetracarboxylic dianhydride used in the first step is out of the above range, the solution stability (viscosity stability) of the amic acid solution obtained may be deteriorated.

There are no particular restrictions to the reaction conditions in the first step, so long as a polyamic acid is formed by the addition reaction, while suppressing an excessive imidization reaction. The reaction is preferably conducted under atmospheric pressure, although the reaction may be conducted under an increased pressure or a reduced pressure. The reaction temperature is preferably 100° C. or lower, more preferably from 20° C. to 80° C. In the first step, the reaction is generally conducted for about 1 to 100 hours under the above temperature conditions. The reaction may be preferably conducted in an inert gas atmosphere such as in nitrogen atmosphere.

The logarithmic viscosity of the polyamic acid obtained in the first step is preferably 0.4 or lower, more preferably from 0.01 to 0.4, particularly preferably from 0.01 to 0.3, further preferably from 0.05 to 0.2. When the diamine and the tetracarboxylic dianhydride are reacted in a nearly equimolar amount in the first step, the polyamic acid obtained often has a logarithmic viscosity of more than 0.4. In such cases, the diamine and the tetracarboxylic dianhydride are reacted in a nearly equimolar amount in the second step, and therefore the polyamic acid obtained inevitably has a high molecular weight. In the case where a high-concentration solution is used for the reaction, when a polyamic acid is polymerized in the first step, the viscosity of the solution obtained in the first step may be significantly high, and in the second step, the reaction of the diamine and the tetracarboxylic dianhydride which are added may not adequately proceed and these components may remain unreacted and undissolved in the polyamic acid solution.

In the second step in the process for producing a polyamic acid solution of the present invention, a diamine, or a diamine and a tetracarboxylic dianhydride are added to the polyamic acid solution obtained in the first step so that the total molar amount of the diamine is substantially equal to the total molar amount of the tetracarboxylic dianhydride, preferably the molar ratio (tetracarboxylic dianhydride/diamine) is within a range of about 1.05 to about 0.95. And then, the diamine and the tetracarboxylic dianhydride are reacted. In the second step, the reaction may be preferably conducted under the same conditions as in the first step as described above. A part of the tetracarboxylic dianhydride added in the second step may be replaced with a tetracarboxylic acid or a lower alcohol ester of a tetracarboxylic acid.

There may be preferably provided, as a result of the second step, an amic acid solution which contains an amic acid having a logarithmic viscosity of 0.4 or lower, preferably from 0.01 to 0.4, more preferably from 0.05 to 0.4, particularly preferably from 0.05 to 0.3 with high reproducibility. In the amic acid solution, substantially all (90% or more, preferably 95% or more) of the acid anhydride groups derived from the tetracarboxylic dianhydride which do not react with an amino group to form an amic acid bond are hydrolyzed to be two carboxyl groups. Furthermore, the amic acid contained in the amic acid solution has a very low molecular weight. Accordingly, an increase in the solution viscosity may be reduced, and therefore the concentration of the amic acid in the amic acid solution obtained may be easily increased. As a result, there may be preferably provided a high-concentration polyamic acid solution having a solid content concentration of 25 wt % or more, preferably from 25 wt % to 50 wt %, more preferably from 30 wt % to 45 wt %. The high-concentration polyamic acid solution has a low viscosity, for example, a solution viscosity at 30° C. of 50 Pa·sec or lower, preferably from 0.5 Pa·sec to 50 Pa·sec, more preferably from 1 Pa·sec to 40 Pa·sec. Therefore, it is practically very useful.

For the preparation of the polyamic acid solution, a solvent containing water in an amount of 0.05 wt % to 2 wt %, more preferably 0.05 wt % to 1 wt % is used in the first step. The water is consumed for the hydrolysis of the acid anhydride group in the tetracarboxylic dianhydride, and the residual water remains in the solution. As the solvent used contains a sufficiently small amount of water, there is no need to adjust the amount of water (remove water from the solution) after the completion of the reaction. Even when water is not removed from the solution, a polyamic acid solution having a water content of 1 wt % or less, for example, may be obtained. The polyamic acid solution contains a sufficiently small amount of water, as described above. Moreover, substantially all of the acid anhydride groups derived from the tetracarboxylic dianhydride are hydrolyzed to be two carboxyl groups except the acid anhydride groups which react with an amino group to form an amic acid bond. Accordingly, every component in the polyamic acid solution is less likely to react at least when stored at a low temperature, and therefore the solution stability may be sufficiently high.

Although the polyamic acid solution of the present invention is very useful as a polyimide precursor solution having a high concentration and a low viscosity, the present invention is not limited to a high-concentration solution. The polyamic acid solution of the present invention may be suitably used at various concentrations in various applications as a polyimide precursor. The polyamic acid may be readily converted to a polyimide by a polymerization/imidization reaction according to a known method such as a thermal imidization by heat treatment accompanied by solvent removal and a chemical imidization by treatment with acetic anhydride, for example, accompanied by solvent removal.

The polyamic acid solution of the present invention may be suitably used as a polyamic acid solution composition containing other components commonly used in a polyimide precursor composition such as an imidization catalyst, an inorganic filler, an organic filler, a reinforcing fiber, carbon black, an anti-foaming agent, a dye, and a pigment. In addition, the polyamic acid solution of the present invention may be suitably used for the formation of a film, particularly a relatively thick film or a film containing a relatively large amount of filler, for the production of a CCL in combination with a copper foil, and for the preparation of an adhesive composition, and an ink composition for a protective film, for example.

The polyamic acid solution of the present invention may have a low viscosity suitable for the production of a polyimide film, particularly a polyimide seamless belt. The polyamic acid solution of the present invention may also have a high concentration and contain a sufficiently small amount of solvent. Therefore, the polyamic acid solution of the present invention may be used to produce a polyimide film, particularly a polyimide seamless belt having excellent properties, with high productivity.

EXAMPLES

The present invention will be described in more detail with reference to Examples. However, the present invention is not limited to the following Examples.

There will be described the measurement methods used in the following Examples. With regard to the amount of water (the content of water and the water content), the amount of water in the solvent used for the reaction in the first step was expressed in terms of "content of water" which was calculated based on the amount of water added to the organic solvent (NMP), because the amount of water as an impurity in the organic solvent used was negligible. The amount of water in the polyamic acid solution obtained was expressed in terms of "water content" which was determined by the following measurement method.

Solid Content Concentration

A sample solution (the weight thereof is referred to as "w1") was heated at 120° C. for 10 min, at 250° C. for 10 min and then at 350° C. for 30 min in a hot air drier, and the weight after the heat treatment (referred to as "w2") was measured. A solid content concentration [wt %] was calculated by the following equation.

Solid content concentration=($w2/w1$)×100

Logarithmic Viscosity

A sample solution was diluted to a concentration of 0.5 g/dL based on the solid content concentration (the solvent was NMP). The time of flow of the diluted solution ($T_1$) was measured at 30° C. using Cannon-Fenske No. 100. A logarithmic viscosity was calculated from $T_1$ and the time of flow of the blank NMP ($T_0$) by the following equation.

Logarithmic viscosity={ln($T_1/T_0$)}/0.5

Solution Viscosity (Rotational Viscosity)

The solution viscosity was measured at 30° C. using Tokimec Inc., type E viscometer.

Water Content

The water content was measured by a water content measuring device (AQV-2000; from Hiranuma Sangyo Co., Ltd.) using a Karl Fischer reagent (HYDRANAL-Composite 5K; from Sigma-Aldrich Corp.).

Solution Stability

A sample solution was stored in an atmosphere at a temperature of 5° C. for one month, and then turbidity, and the presence or absence of phase separation and precipitation was evaluated by visual observation. A solution which was turbid or had a phase separation or a precipitation observed after storage was evaluated as x, while a solution which remained unchanged after storage was evaluated as ○.

Film-Forming Properties

A sample solution was applied on a glass substrate such that the thickness of the polyimide film obtained was 50 μm, and then it was heated at 120° C. for 30 min, at 150° C. for 10 min, at 200° C. for 10 min, at 250° C. for 10 min and at 350° C. for 10 min in a hot air drier for solvent removal and the polymerization/imidization reaction, to produce a polyimide film. The presence or absence of defect such as bulge, crack and powdering of the polyimide film was evaluated by visual observation. A film which had no defect such as bulge, crack and powdering observed was evaluated as ○, while a film which had a defect observed was evaluated as x.

Abbreviations of compounds used in the following Examples are as follows:
s-BPDA: 3,3',4,4'-biphenyltetracarboxylic dianhydride,
a-BPDA: 2,3,3',4'-biphenyltetracarboxylic dianhydride,
BPTA: 3,3',4,4'-biphenyltetracarboxylic acid,
DADE: 4,4'-diaminodiphenyl ether,
PPD: p-phenylenediamine,
MPD: m-phenylenediamine,
2,4-TDA: 2,4-diaminotoluene,
NMP: N-methyl-2-pyrrolidone.

Example 1

In a 5 L separable flask equipped with a stirrer, a stirring blade, a reflux condenser and a nitrogen-gas inlet tube were placed 3399.27 g of NMP, 11.89 g of water, 194.19 g of s-BPDA and 66.09 g of DADE (molar ratio of water [water/the acid component]: 1/1; content of water: 0.35 wt %; molar ratio of the acid component [the acid component/the diamine component]: 2/1). And then, the mixture was stirred at a reaction temperature of 50° C. for 15 hours under nitrogen gas stream for reaction. Subsequently, 600 g of DADE was dissolved in the reaction solution, and 582.55 g of s-BPDA and 194.19 g of a-BPDA were added. Then, the mixture was stirred at a reaction temperature of 50° C. for 20 hours for reaction.

The resulting reaction solution had a logarithmic viscosity of 0.375, a solution viscosity of 37 Pa·sec, a solid content concentration of 30.7 wt %, and a water content of 1 wt % or less. For this solution, the solution stability was evaluated as ○ and the film-forming properties were evaluated as ○.

Example 2

In a 5 L separable flask equipped with a stirrer a stirring blade, a reflux condenser and a nitrogen-gas inlet tube were placed 3387.27 g of NMP, 11.89 g of water, 388.37 g of s-BPDA and 132.17 g of DADE (molar ratio of water [water/the acid component]: 1/2; content of water: 0.33 wt %; molar ratio of the acid component [the acid component/the diamine component]: 2/1). And then, the mixture was stirred at a reaction temperature of 50° C. for 15 hours for reaction. Subsequently, 528.69 g of DADE was dissolved in the reaction solution, and 388.37 g of s-BPDA and 194.19 g of a-BPDA were added. Then, the mixture was stirred at a reaction temperature of 50° C. for 20 hours for reaction.

The resulting reaction solution had a logarithmic viscosity of 0.288, a solution viscosity of 12 Pa·sec, a solid content concentration of 30.1 wt %, and a water content of 1 wt % or less. For this solution, the solution stability was evaluated as ○ and the film-forming properties were evaluated as ○.

Example 3

In a 5 L separable flask equipped with a stirrer, a stirring blade, a reflux condenser and a nitrogen-gas inlet tube were placed 3387.27 g of NMP, 23.79 g of water, 485.50 g of s-BPDA and 132.17 g of DADE (molar ratio of water [water/the acid component]: 215; content of water: 0.63 wt %; molar ratio of the acid component [the acid component/the diamine component]: 5/2). And then, the mixture was stirred at a reaction temperature of 50° C. for 17 hours for reaction. Subsequently, 528.69 g of DADE was dissolved in the reaction solution, and 291.24 g of s-BPDA and 194.19 g of a-BPDA were added. Then, the mixture was stirred at a reaction temperature of 50° C. for 20 hours for reaction.

The resulting reaction solution had a logarithmic viscosity of 0.171, a solution viscosity of 2 Pa·sec, a solid content concentration of 30.7 wt %, and a water content of 1 wt % or less. For this solution, the solution stability was evaluated as ○ and the film-forming properties were evaluated as ○.

Example 4

In a 5 L separable flask equipped with a stirrer, a stirring blade, a reflux condenser and a nitrogen-gas inlet tube were placed 3411.06 g of NMP, 17.84 g of water, 388.37 g of s-BPDA and 132.17 g of DADE (molar ratio of water [water/the acid component]: 3/4; content of water: 0.49 wt %; molar ratio of the acid component [the acid component/the diamine component]: 2/1). And then, the mixture was stirred at a reaction temperature of 50° C. for 17 hours for reaction. Subsequently, 528.69 g of DADE was dissolved in the reaction solution, and 388.37 g of s-BPDA and 194.19 g of a-BPDA were added. Then, the mixture was stirred at a reaction temperature of 50° C. for 20 hours for reaction.

The resulting reaction solution had a logarithmic viscosity of 0.246, a solution viscosity of 6 Pa·sec, a solid content concentration of 30.2 wt %, and a water content of 1 wt % or less. For this solution, the solution stability was evaluated as ○ and the film-forming properties were evaluated as ○.

Example 5

In a 5 L separable flask equipped with a stirrer, a stirring blade, a reflux condenser and a nitrogen-gas inlet tube were placed 3331.96 g of NMP, 17.45 g of water, 196.35 g of s-BPDA, 196.35 g of a-BPDA and 133.65 g of DADE (molar ratio of water [water/the acid component]: 3/4; content of water: 0.49 wt %; molar ratio of the acid component [the acid component/the diamine component]: 2/1). And then, the mixture was stirred at a reaction temperature of 70° C. for 17 hours for reaction. Subsequently, 534.59 g of DADE was dissolved in the reaction solution, and 589.06 g of s-BPDA was added. Then, the mixture was stirred at a reaction temperature of 50° C. for 20 hours for reaction.

The resulting reaction solution had a logarithmic viscosity of 0.199, a solution viscosity of 3 Pa·sec, a solid content concentration of 31.3 wt %, and a water content of 1 wt % or less. For this solution, the solution stability was evaluated as ○ and the film-forming properties were evaluated as ○.

Example 6

In a 5 L separable flask equipped with a stirrer, a stirring blade, a reflux condenser and a nitrogen-gas inlet tube were placed 3331.96 g of NMP, 17.45 g of water, 196.35 g of s-BPDA, 196.35 g of a-BPDA and 133.65 g of DADE (molar ratio of water [water/the acid component]: 3/4; content of water: 0.49 wt %; molar ratio of the acid component [the acid component/the diamine component] 2/1). And then, the mixture was stirred at a reaction temperature of 50° C. for 17 hours for reaction. Subsequently, 534.59 g of DADE was dissolved in the reaction solution, and 589.06 g of s-BPDA was added. Then, the mixture was stirred at a reaction temperature of 50° C. for 20 hours for reaction.

The resulting reaction solution had a logarithmic viscosity of 0.229, a solution viscosity of 6 Pa·sec, a solid content concentration of 31.1 wt %, and a water content of 0.22 wt %. For this solution, the solution stability was evaluated as ○ and the film-forming properties were evaluated as ○.

Example 7

In a 5 L separable flask equipped with a stirrer, a stirring blade, a reflux condenser and a nitrogen-gas inlet tube were placed 3331.96 g of NMP, 17.45 g of water, 196.35 g of s-BPDA, 196.35 g of a-BPDA and 133.65 g of DADE (molar ratio of water [water/the acid component]: 3/4; content of water: 0.49 wt %; molar ratio of the acid component [the acid component/the diamine component]: 2/1). And then, the mixture was stirred at a reaction temperature of 70° C. for 3 hours for reaction. Subsequently, 534.59 g of DADE was dissolved in the reaction solution, and 589.06 g of s-BPDA was added. Then, the mixture was stirred at a reaction temperature of 50° C. for 20 hours for reaction.

The resulting reaction solution had a logarithmic viscosity of 0.263, a solution viscosity of 10 Pa·sec, a solid content concentration of 30.9 wt %, and a water content of 0.31 wt %. For this solution, the solution stability was evaluated as ○ and the film-forming properties were evaluated as ○.

Example 8

In a 5 L separable flask equipped with a stirrer, a stirring blade, a reflux condenser and a nitrogen-gas inlet tube were placed 3330.11 g of NMP, 19.53 g of water, 216.52 g of s-BPDA, 216.53 g of a-BPDA and 147.37 g of DADE (molar ratio of water [water/the acid component]: 3/4; content of water: 0.50 wt %; molar ratio of the acid component [the acid component/the diamine component]: 2/1). And then, the mixture was stirred at a reaction temperature of 70° C. for 3 hours for reaction. Subsequently, 221.05 g of DADE and 198.99 g of PPD were dissolved in the reaction solution, and 649.55 g of s-BPDA was added. Then, the mixture was stirred at a reaction temperature of 50° C. for 20 hours for reaction.

The resulting reaction solution had a logarithmic viscosity of 0.273, a solution viscosity of 17 Pa·sec, a solid content concentration of 30.4 wt %, and a water content of 1 wt % or less. For this solution, the solution stability was evaluated as ○ and the film-forming properties were evaluated as ○.

Example 9

In a 5 L separable flask equipped with a stirrer, a stirring blade, a reflux condenser and a nitrogen-gas inlet tube were placed 3289.87 g of NMP, 60.13 g of water, 294.53 g of s-BPDA, 196.35 g of a-BPDA and 100.24 g of DADE (molar ratio of water [water/the acid component]: 1/1; content of water: 1.62 wt %; molar ratio of the acid component [the acid component/the diamine component]: 10/3). And then, the mixture was stirred at a reaction temperature of 50° C. for 4 hours for reaction. Subsequently, 568.00 g of DADE was dissolved in the reaction solution, and 490.88 g of s-BPDA was added. Then, the mixture was stirred at a reaction temperature of 50° C. for 1 hour for reaction.

The resulting reaction solution had a logarithmic viscosity of 0.154, a solution viscosity of 2 Pa·sec, a solid content concentration of 30.6 wt %, and a water content of 0.79 wt %. For this solution, the solution stability was evaluated as ○ and the film-forming properties were evaluated as ○.

Example 10

In a 5 L separable flask equipped with a stirrer, a stirring blade, a reflux condenser and a nitrogen-gas inlet tube were placed 3289.87 g of NMP, 60.13 g of water, 294.53 g of s-BPDA, 196.35 g of a-BPDA and 133.65 g of DADE (molar ratio of water [water/the acid component]: 1/1; content of water: 1.61 wt %; molar ratio of the acid component [the acid component/the diamine component]: 10/4). And then, the mixture was stirred at a reaction temperature of 50° C. for 4 hours for reaction. Subsequently, 534.59 g of DADE was dissolved in the reaction solution, and 490.88 g of s-BPDA was added. Then, the mixture was stirred at a reaction temperature of 50° C. for 20 hours for reaction.

The resulting reaction solution had a logarithmic viscosity of 0.169, a solution viscosity of 2 Pa·sec, a solid content concentration of 30.2 wt %, and a water content of 0.87 wt %. For this solution, the solution stability was evaluated as ○ and the film-forming properties were evaluated as ○.

Example 11

In a 5 L separable flask equipped with a stirrer, a stirring blade, a reflux condenser and a nitrogen-gas inlet tube were placed 3289.87 g of NMP, 18.04 g of water, 196.35 g of s-BPDA, 196.35 g of a-BPDA and 133.65 g of DADE (molar ratio of water [water/the acid component]: 3/4; content of water: 0.50 wt %; molar ratio of the acid component [the acid component/the diamine component]: 2/1). And then, the mixture was stirred at a reaction temperature of 50° C. for 17 hours for reaction. Subsequently, 534.59 g of DADE was dissolved in the reaction solution, and 589.06 g of s-BPDA was added. Then, the mixture was stirred at a reaction temperature of 50° C. for 20 hours for reaction.

The resulting reaction solution had a logarithmic viscosity of 0.245, a solution viscosity of 6 Pa·sec, a solid content concentration of 30.8 wt %, and a water content of 0.44 wt %. For this solution, the solution stability was evaluated as ○ and the film-forming properties were evaluated as ○.

Example 12

In a 5 L separable flask equipped with a stirrer, a stirring blade, a reflux condenser and a nitrogen-gas inlet tube were placed 3225.75 g of NMP, 36.04 g of water, 588.44 g of s-BPDA and 120.16 g of DADE (molar ratio of water [water/the acid component]: 1 µl; content of water: 1.01 wt %; molar ratio of the acid component [the acid component/the diamine component]: 10/3). And then, the mixture was stirred at a reaction temperature of 50° C. for 15 hours for reaction. Subsequently, 680.88 g of DADE was dissolved in the reaction solution, and 353.06 g of s-BPDA and 235.38 g of a-BPDA were added. Then, the mixture was stirred at a reaction temperature of 50° C. for 20 hours for reaction.

The resulting reaction solution had a logarithmic viscosity of 0.154, a solution viscosity of 8 Pa·sec, a solid content concentration of 36.0 wt %, and a water content of 1 wt % or less. For this solution, the solution stability was evaluated as ○ and the film-forming properties were evaluated as ○.

Example 13

In a 1 L separable flask equipped with a stirrer, a stirring blade, a reflux condenser and a nitrogen-gas inlet tube were placed 670.00 g of NMP, 3.61 g of water, 78.54 g of s-BPDA and 26.73 g of DADE (molar ratio of water [water/the acid component]: 3/4; content of water: 0.56 wt %; molar ratio of the acid component [the acid component/the diamine component]: 2/1). And then, the mixture was stirred at a reaction temperature of 70° C. for 3 hours for reaction. Subsequently, 106.92 g of DADE was dissolved in the reaction solution, and 117.81 g of s-BPDA was added. Then, the mixture was stirred at a reaction temperature of 50° C. for 20 hours for reaction.

The resulting reaction solution had a logarithmic viscosity of 0.240, a solution viscosity of 9 Pa·sec, a solid content concentration of 31.0 wt %, and a water content of 1 wt % or less. For this solution, the solution stability was evaluated as ○ and the film-forming properties were evaluated as ○.

Example 14

In a 1 L separable flask equipped with a stirrer, a stirring blade, a reflux condenser and a nitrogen-gas inlet tube were placed 670.00 g of NMP, 3.92 g of water, 85.27 g of s-BPDA and 29.02 g of DADE (molar ratio of water [water/the acid component]: 3/4; content of water: 0.58 wt %; molar ratio of the acid component [the acid component/the diamine component]: 2/1). And then, the mixture was stirred at a reaction temperature of 70° C. for 3 hours for reaction. Subsequently, 43.53 g of DADE and 44.27 g of 2,4-TDA were dissolved in the reaction solution, and 127.91 g of s-BPDA was added. Then, the mixture was stirred at a reaction temperature of 50° C. for 20 hours for reaction.

The resulting reaction solution had a logarithmic viscosity of 0.260, a solution viscosity of 8 Pa·sec, a solid content concentration of 31.0 wt %, and a water content of 1 wt % or less. For this solution, the solution stability was evaluated as ○ and the film-forming properties were evaluated as ○.

Example 15

In a 1 L separable flask equipped with a stirrer, a stirring blade, a reflux condenser and a nitrogen-gas inlet tube were placed 670.00 g of NMP, 4.28 g of water, 93.27 g of s-BPDA and 19.37 g of 2,4-TDA (molar ratio of water [water/the acid component]: 3/4; content of water: 0.63 wt %; molar ratio of the acid component [the acid component/the diamine component]: 2/1). And then, the mixture was stirred at a reaction temperature of 70° C. for 3 hours for reaction. Subsequently, 77.47 g of 2,4-TDA was dissolved in the reaction solution, and 139.01 g of s-BPDA was added. Then, the mixture was stirred at a reaction temperature of 50° C. for 20 hours for reaction.

The resulting reaction solution had a logarithmic viscosity of 0.150, a solution viscosity of 5 Pa·sec, a solid content concentration of 31.5 wt %, and a water content of 1 wt % or less. For this solution, the solution stability was evaluated as ○ and the film-forming properties were evaluated as ○.

Example 16

In a 1 L separable flask equipped with a stirrer, a stirring blade, a reflux condenser and a nitrogen-gas inlet tube were placed 670.00 g of NMP, 3.74 g of water, 81.58 g of s-BPDA and 22.21 g of DADE (molar ratio of water [water/the acid component]: 3/4; content of water: 0.56 wt %; molar ratio of the acid component [the acid component/the diamine component]: 2/1). And then, the mixture was stirred at a reaction temperature of 70° C. for 3 hours for reaction. Subsequently, 88.84 g of DADE and 15.00 g of MPD were dissolved in the reaction solution, and 122.37 g of s-BPDA was added. Then, the mixture was stirred at a reaction temperature of 50° C. for 20 hours for reaction.

The resulting reaction solution had a logarithmic viscosity of 0.230, a solution viscosity of 8 Pa·sec, a solid content concentration of 30.5 wt %, and a water content of 1 wt % or less. For this solution, the solution stability was evaluated as ○ and the film-forming properties were evaluated as ○.

Example 17

In a 1 L separable flask equipped with a stirrer, a stirring blade, a reflux condenser and a nitrogen-gas inlet tube were placed 670.00 g of NMP, 3.98 g of water, 86.61 g of s-BPDA and 14.74 g of DADE (molar ratio of water [water/the acid component]: 3/4; content of water: 0.60 wt %; molar ratio of the acid component [the acid component/the diamine component]: 2/1). And then, the mixture was stirred at a reaction temperature of 70° C. for 3 hours for reaction. Subsequently, 58.95 g of DADE and 39.80 g of MPD were dissolved in the reaction solution, and 129.91 g of s-BPDA was added. Then, the mixture was stirred at a reaction temperature of 50° C. for 20 hours for reaction.

The resulting reaction solution had a logarithmic viscosity of 0.220, a solution viscosity of 9 Pa·sec, a solid content concentration of 30.8 wt %, and a water content of 1 wt % or less. For this solution, the solution stability was evaluated as ○ and the film-forming properties were evaluated as ○.

Comparative Example 1

In a 1 L separable flask equipped with a stirrer, a stirring blade, a reflux condenser and a nitrogen-gas inlet tube were placed 670.00 g of NMP, 12.03 g of water, 157.08 g of s-BPDA, 39.27 g of a-BPDA and 133.65 g of DADE (molar ratio of water [water/the acid component]: 5/4; content of water: 1.19 wt %; molar ratio of the acid component [the acid component/the diamine component]: 1). And then, the mixture was stirred at a reaction temperature of 50° C. for 15 hours for reaction.

The resulting reaction solution had a logarithmic viscosity of 1.018, a solution viscosity of 1,000 Pa·sec or higher, and a solid content concentration of 30.4 wt %. In the test for the film-forming properties, this solution was not easily cast due to its higher solution viscosity, and a uniform coating film was not obtained.

Comparative Example 2

In a 5 L separable flask equipped with a stirrer, a stirring blade, a reflux condenser and a nitrogen-gas inlet tube were placed 3399.27 g of NMP, 11.89 g of water, 582.56 g of s-BPDA and 198.26 g of DADE (molar ratio of water [water/the acid component]: 1/3; content of water: 0.31 wt %; molar ratio of the acid component [the acid component/the diamine component]: 2). And then, the mixture was stirred at a reaction temperature of 50° C. for 15 hours for reaction. Subsequently, 462.60 g of DADE was dissolved in the reaction solution, and 194.18 g of s-BPDA and 194.19 g of a-BPDA were added. Then, the mixture was stirred at a reaction temperature of 50° C. for 25 hours for reaction, but the tetracarboxylic dianhydride component added was not dissolved in the reaction solution, and a polyamic acid solution was not obtained.

Comparative Example 3

In a 5 L separable flask equipped with a stirrer, a stirring blade, a reflux condenser and a nitrogen-gas inlet tube were placed 1343.75 g of NMP, 280.45 g of s-BPDA, 76.50 g of a-BPDA and 260.34 g of DADE (molar ratio of the acid component [the acid component/the diamine component]: 0.93). And then, the mixture was stirred at a reaction temperature of 50° C. for 15 hours for reaction.

The resulting reaction solution had a higher viscosity, specifically, a logarithmic viscosity of 0.44, and a solution viscosity of 51.3 Pa·sec. To the reaction solution was added 31.75 g of BPTA so that the molar ratio of the total acid component [the acid component/the diamine component] is 1, but BPTA was not dissolved in the reaction solution, and a homogeneous polyamic acid solution was not obtained.

INDUSTRIAL APPLICABILITY

According to the present invention, there may be provided a novel process for producing a polyamic acid solution having a high concentration and a low viscosity reproducibly and reliably, by controlling the molecular weight of the polyamic acid to a predetermined low level. Furthermore, according to the present invention, there may be provided a novel polyamic acid solution having a polyamic acid logarithmic viscosity of 0.4 or lower. This polyamic acid solution may be suitably used for the formation of a film, particularly a relatively thick film or a film containing a relatively large amount of filler, for the production of a CCL in combination with a copper foil, and for the preparation of an adhesive composition, and an ink composition for a protective film, for example.

The invention claimed is:

1. A process for producing a polyamic acid solution by reacting a diamine with a tetracarboxylic dianhydride in a solvent, consisting essentially of:
 a first step in which a diamine is reacted with a molar excess of a tetracarboxylic dianhydride in a solvent containing more than ⅓ mole of water per mole of the tetracarboxylic dianhydride, thereby preparing a polyamic acid solution in which an acid anhydride group derived from the tetracarboxylic dianhydride at the polyamic acid molecular terminal is hydrolyzed to be two carboxyl groups; and
 a second step in which a diamine and a tetracarboxylic dianhydride are added to the polyamic acid solution obtained in the first step so that the molar amount of the diamine component is substantially equal to the molar amount of the tetracarboxylic acid component, and then the diamine and the tetracarboxylic dianhydride are reacted thereby preparing a homogeneous polyamic acid solution having a polyamic acid logarithmic viscosity of 0.4 or lower, a solid content concentration of 25 wt % to 50 wt %, and a water content of 1 wt % or less,
 wherein the amount of the tetracarboxylic dianhydride to be reacted in the first step is within a range of 10 mol % to 70 mol % based on the total amount of the tetracarboxylic dianhydride to be reacted in the first step and the second step.

2. The process for producing a polyamic acid solution as claimed in claim 1, wherein, the molar ratio of the tetracarboxylic dianhydride to the diamine reacted in the first step is 1.2 or more.

3. The process for producing a polyamic acid solution as claimed in claim 1, wherein, the content of water in the solvent used in the first step is within a range of 0.05 wt % to 2 wt %.

4. The process for producing a polyamic acid solution as claimed in claim 3, wherein water is not removed from the solution after completion of the reaction to achieve the water content of 1 wt % or less.

5. The process for producing a polyamic acid solution as claimed in claim 1, wherein the polyamic acid solution obtained after the second step has a solution viscosity at 30° C. of 50 Pa·sec or lower.

* * * * *